United States Patent [19]

Stoll

[11] Patent Number: 5,025,834
[45] Date of Patent: Jun. 25, 1991

[54] MOUNTING PLATE STORING CONDUCTOR FUNCTION

[75] Inventor: Kurt Stoll, Esslingen, Fed. Rep. of Germany

[73] Assignee: Festo KG, Esslingen, Fed. Rep. of Germany

[21] Appl. No.: 380,971

[22] Filed: Jul. 17, 1989

[30] Foreign Application Priority Data

Aug. 16, 1988 [DE] Fed. Rep. of Germany ....... 3827749

[51] Int. Cl.⁵ ............................................. F16K 11/00
[52] U.S. Cl. ................................... 137/560; 137/271; 137/884
[58] Field of Search ......................... 137/884, 560, 271

[56] References Cited

U.S. PATENT DOCUMENTS

| 3,234,963 | 2/1966 | Lyon | 137/884 |
| 3,550,621 | 12/1970 | Lansky et al. | 137/884 |
| 3,646,963 | 3/1972 | Klee | 137/884 |
| 3,654,960 | 4/1972 | Kiernan | 137/884 |
| 3,698,432 | 10/1972 | Kutz | 137/884 |
| 3,707,989 | 1/1973 | Jullien-Davin | 137/884 |
| 3,805,847 | 4/1974 | Manning | 138/115 |
| 3,875,959 | 4/1975 | Bouteille | 137/884 X |
| 3,934,605 | 1/1976 | Legris | 137/884 X |
| 4,130,137 | 12/1978 | Lane | 137/884 |
| 4,230,143 | 10/1980 | Dettmann et al. | 137/884 X |
| 4,301,832 | 11/1981 | Smith | 137/884 X |
| 4,305,430 | 12/1981 | Svensson | 138/115 |
| 4,348,942 | 9/1982 | Stoll | 137/884 X |
| 4,378,027 | 3/1983 | Weirich et al. | 137/884 X |
| 4,415,004 | 11/1983 | Bouteille et al. | 137/884 |
| 4,483,365 | 11/1984 | Fallon | 137/271 X |
| 4,512,362 | 4/1985 | Groeschner | 137/884 X |
| 4,524,807 | 6/1985 | Toliusis | 137/884 |
| 4,527,589 | 7/1985 | Stoll | 137/884 X |
| 4,815,496 | 3/1989 | Nishitani et al. | 137/884 |
| 4,896,700 | 1/1990 | Stoll | 137/884 |

FOREIGN PATENT DOCUMENTS

| 1923833 | 11/1970 | Fed. Rep. of Germany . |
| 2232387 | 1/1974 | Fed. Rep. of Germany . |
| 2943504 | 5/1981 | Fed. Rep. of Germany . |
| 3246970 | 5/1984 | Fed. Rep. of Germany . |
| 3309786 | 7/1984 | Fed. Rep. of Germany . |
| 8423236.6 | 1/1985 | Fed. Rep. of Germany . |
| 3507167 | 9/1986 | Fed. Rep. of Germany . |
| 3609605 | 9/1987 | Fed. Rep. of Germany . |
| 3733708 | 9/1988 | Fed. Rep. of Germany . |
| 2439354 | 5/1980 | France . |
| 2530520 | 1/1984 | France . |

OTHER PUBLICATIONS

Article entitled "Drucköhlzufuhr zu Spannelementen auf hydraulisch betätigten Vorrichtungen", from WT Zeitschrift fur Industrielle Fertigung, pp. 663–667; vol. 76, No. 11 (1986).

*Primary Examiner*—John Rivell
*Attorney, Agent, or Firm*—Flynn, Thiel, Boutell & Tanis

[57] ABSTRACT

A device for conducting a fluid or for conducting electricity has at least one supply member which is internally provided with supply conductors for the fluid of the electric current. On the outer periphery the member is provided with attachment recesses by way of which it may be firmly connected with other structures.

25 Claims, 6 Drawing Sheets

MOUNTING PLATE STORING CONDUCTOR FUNCTION

BACKGROUND OF THE INVENTION

The invention relates to an instrumentality having a conducting function, and more particularly but not exclusively to such an instrumentality for conducting a fluid such as compressed air or a liquid, or for electricity.

Known systems for this purpose have for instance the form of tubes with a circular cross section. They may be laid in any desired form and the use of piping is more particularly suitable for conducting fluids such as compressed air or liquids for hydraulic systems. There is however the disadvantage in this respect that such piping is expensive to secure to support structures such as walls. A further shortcoming is that the devices or apparatus to be supplied via the piping with the medium, such as cylinder and piston units or valves or other auxiliary equipment, have to be mounted separately alongside the piping, this also involving elaborate arrangements since complicated holding means are generally required. A further inconvenience is that frequently many ducts are required for the medium to be conducted so that a number of pipes have to laid alongside each other, this causing an unnecessary increase in the costs of pipe laying and in the bulk of the equipment.

SHORT SUMMARY OF THE INVENTION

One object of the present invention is to devise an instrumentality of the initially noted type which while being a simple structure may be quickly installed.

A further aim of the invention is to facilitate the assembly of additional components and/or devices or the like.

In order to achieve these or other aims appearing from the present specification and drawings, the invention provides at least one supply member which has at least one and more especially two supply conductors within which conduction may take place, such conductors terminating in its interior, such supply member having on an outer periphery thereof at least one elongated groove-like attachment recess by means of which it may be attached to a structure.

The presence of at least one attachment recess makes it possible for each respective supply member to be reliably secured to a structural element without any problems. Any laying operations which may prove necessary are thus very simple. In addition or as an alternative the attachment recesses may also be used for connection with further pieces of equipment such as cylinder units, workpieces, work holding devices, sensors for equipment, valve devices and the like, and more particularly for securing such structures. This is more especially an advantage if additional structures are to be supplied via a supply conductor with fluid and are to discharge into such conductor. The arrangement is directly adjacent to the supply conductors so that sprawling hoses and cables and the like conductors are avoided. The number of the supply conductors may be selected as required so that even if there is a requirement for a plurality of supply ducts only one supply member is needed. The supply ducts make possible use in any conducting system, as for instance in a vacuum system, or in a compressed air system for liquids such as refrigerant. Use is also possible in a system for the supply of electric current, in which case the conductors would be cables. While the instrumentality in accordance with the invention may be in the form of a simple supply strand of any desired length, an arrangement with two parallel supply conductors is particularly convenient in this respect, or it may take the form of a holding or gripping member for practically any desired type of additional elements.

Further features of the invention are described hereinafter.

In accordance with one feature of the invention the supply member may be in the form of an extrusion extrude. During production, the attachment recesses and the supply conductors may be produced without any machining. Preferably a number of supply members may be placed adjacent to each other laterally or in tandem so that there is flexibility as regards the breadth and/or the length. The supply and removal of medium to and from a supply conductor may be through end duct openings at the outer side of the member. However there is a particular advantage if at least one of the supply conductors is able to be tapped at one point at least between the ends of the conductors. Then it is preferred to provide ports, which are arranged transversely in relation to the longitudinal direction of the conductor so that they terminate at one end in the associated supply conductor and on the other end at the outer side of the supply member. The medium may thus be drawn off at any desired point along the supply member so that it may be used for instance for the operation of work holding devices or also for the actuation of units such as fluid actuator cylinder or valves. The connection ports, which are preferably produced without machining, may be made prior to installation by the manufacturer of the system and/or subsequently by the user thereof, as for example by piercing the material of the member.

In what follows the invention will be described with reference to the accompanying drawings.

DETAILED ACCOUNT OF WORKING EXAMPLES OF THE INVENTION

The device shown in the individual figures for the conduction of fluid or electricity comprises at least one supply member or mounting plate 1 which in its interior has at least one supply conductor or conduit 2, which is preferably linear in configuration and more particularly terminates at opposite sides 3 and 3' of the member. Preferred forms of the invention are provided with two supply conductors (see FIGS. 1 and 7 through 18). Other preferred forms of the invention (see FIGS. 2 through 6) are also provided with at least two or preferably more such supply conductors. The number of supply connectors may be selected in accordance with the particular application of the supply member. Supply members 1 with a relatively small number of supply conductors 2 preferably possess a strand-like or rail-like configuration, and if there is a larger number of supply conductors 2, the structure will tend to be tabular.

The supply conductors 2 are suitable for the conduction of fluids, more especially in a gaseous form, as for instance compressed air. They may also be used for a liquid such as the driving liquid used in a hydraulic system, or a refrigerant. The supply members may be also used for electrical systems in which case the current is then the "medium". The supply conductors are then used for the accommodation of electrical cables 4 therein (see FIG. 4).

Figure 17:
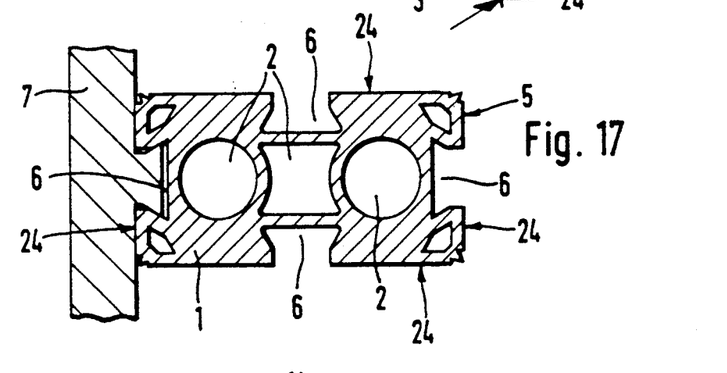
FIGS. 17 and 18 show further possible cross-sectional forms of supply members.

On its outer periphery 5 each supply member 1 has at least one elongated and more especially groove-like attachment recess, by means of which it may when required be connected with other structures or devices or apparatus in a permanent manner. The drawings show some other structures which may be connected by way of example. FIG. 17 shows a supporting wall 7, FIG. 16 a foot 8 or a sensor mount, FIG. 8 a piston and cylinder unit 9, FIGS. 9 through 13 fastening elements 10 for a plurality of supply members 1, FIG. 18 a connection fastening member 14, FIG. 15 an additional member 15 for elements to be laid such as cables, and FIGS. 3 and 5 holding devices 17 for objects such as parts of equipment or the like.

In the case of all the illustrated forms of the invention the attachment recesses 6 and the supply conductors 2 in the supply member 1 are arranged parallel to each other. Furthermore the attachment recesses 6 at the sides 3 and 3' are preferably open at the ends so that the supply members may be simply produced in the form of drawn prismatic members with a constant cross section, the conductors and the recesses being directly formed during the drawing or extruding process. The use of aluminum material has in this respect been found to be advantageous as a material for the supply member.

Figure 14:
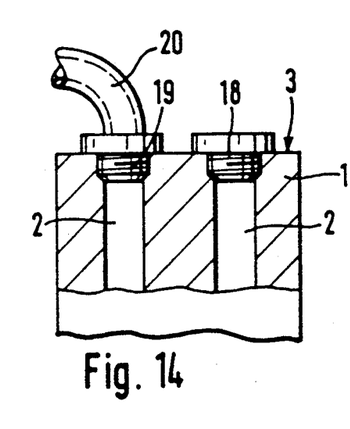
FIG. 14 is a partly broken away view of the axial end part of a supply member according to the invention.

It will be clear that in particular the supply conductors 2 may be shut off at one end if this should be desired and a suitable stopper plug is indicated at 18 in FIG. 14. This figure also shows the possibility of the arrangement of a connecting device 19 in the ends of the conductors on the ends 3 and 3' of the member in order for instance to provide for connection of pressure hoses or other ducts 20 leading to loads 21 and/or devices 22 for supplying medium (indicated diagrammatically in broken lines in FIGS. 1 and 2). The devices 22 may be a supply of fluid, a device for producing vacuum, a fluid accumulator or a device for supplying electrical power. The items mentioned are only given by way of example and not in a restrictive sense.

All the supply conductors 2 used may be joined to a common device 22, it being possible for control devices 23 as for instance in the form of valves to be placed in the supply conductors 2 and lines 20 if desired. However it is particularly preferred to use the supply conductors 2 in a supply member 1 for different fluids and for the conveyance of such fluids in different directions. Supply members 1 with two supply conductors 2 thus makes it possible for supply and spent air to be conducted through a single member in pneumatic systems for instance.

It has turned out to be advantageous for the respective supply member to be made with a cross section in the form of a polygon and, as in the working examples of the invention, preferably rectangular, as for instance in the form of a square. The result is thus the form of a rectangular prism, which leads to substantially flat outer surface parts of the supply member. At least one of the lateral external surfaces 24 of a respective supply member is provided with at least one attachment recess 6. The term "lateral" in this context is related to the parts of the member at the periphery of the individual supply conductors 2 and for the sake of simplicity in what follows the intention is in this respect to define the longitudinal direction or axis 25 of the member running parallel to the supply conductors 2.

Any one of a large number of variations is possible. Each outer surface 24 may be formed with one or more attachment recesses or may be made without such recesses.

Figure 8:
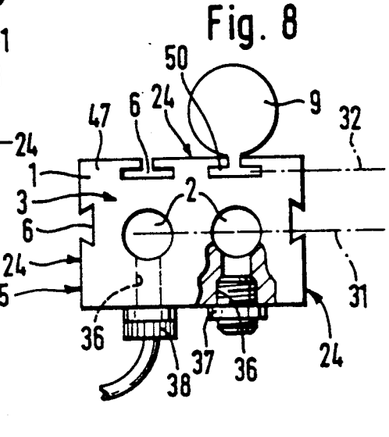
FIG. 8 is an end-on view of a device in accordance with the invention in which an auxiliary device is arranged in an attachment recess and conductors are tapped.
Figure 15:
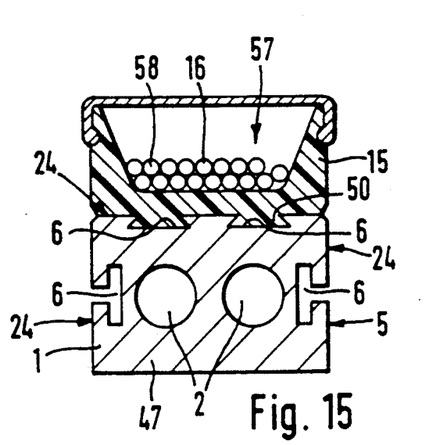
FIGS. 15 and 16 show further examples of devices with receiving spaces or chambers for the elements to be laid, FIG. 15 showing a cross section generally on the section line XV—XV in FIG. 16.
Figure 16:
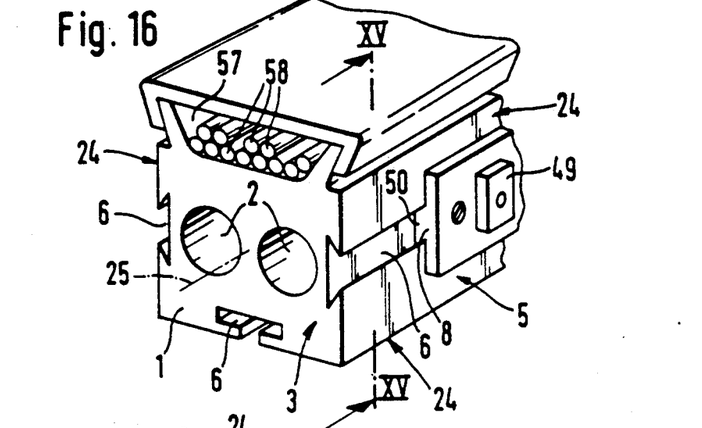

In the case of the working examples shown in FIGS. 1, 8, 15 and 16 there are attachment recesses 6 provided in three consecutive outer surfaces 24. As will be seen from FIG. 1, those three outer surfaces 24 have a single attachment recess 6 situated generally in the middle of each surface. In the case of FIGS. 8 and 15, each of the opposite outer surfaces 24 has a single attachment recess 6 and the intermediately placed outer surface 24 has two spaced attachment recesses 6.

In the working examples shown in FIGS. 2 through 6 one single outer surface 24 has a plurality of linear attachment recesses 6 which are parallel to each other. They subdivide the outer surface 24 into a number of more preferably rectangular area sections 29 on a holding surface 30. The area sections 29 may be plain or roughened and/or may have depressions therein if required.

Furthermore, the majority of the supply conductors 2 provided in the supply members of FIGS. 2 through 6 are linear and the individual conductors 2 are placed parallel to each other with a lateral spacing therebetween. It is possible to ensure a low height to the plate if the supply conductors 2 are placed at least approximately in a common conductor plane (or conduit plane) 31 (see also FIG. 1) which is preferably arranged to be parallel to one of the plurality of attachment recesses 6 in the outer surface 24 and more particularly to recess plane 32 defining the holding surface 30 (see FIGS. 2 through 4, 6, 8 and 18).

Figure 1:
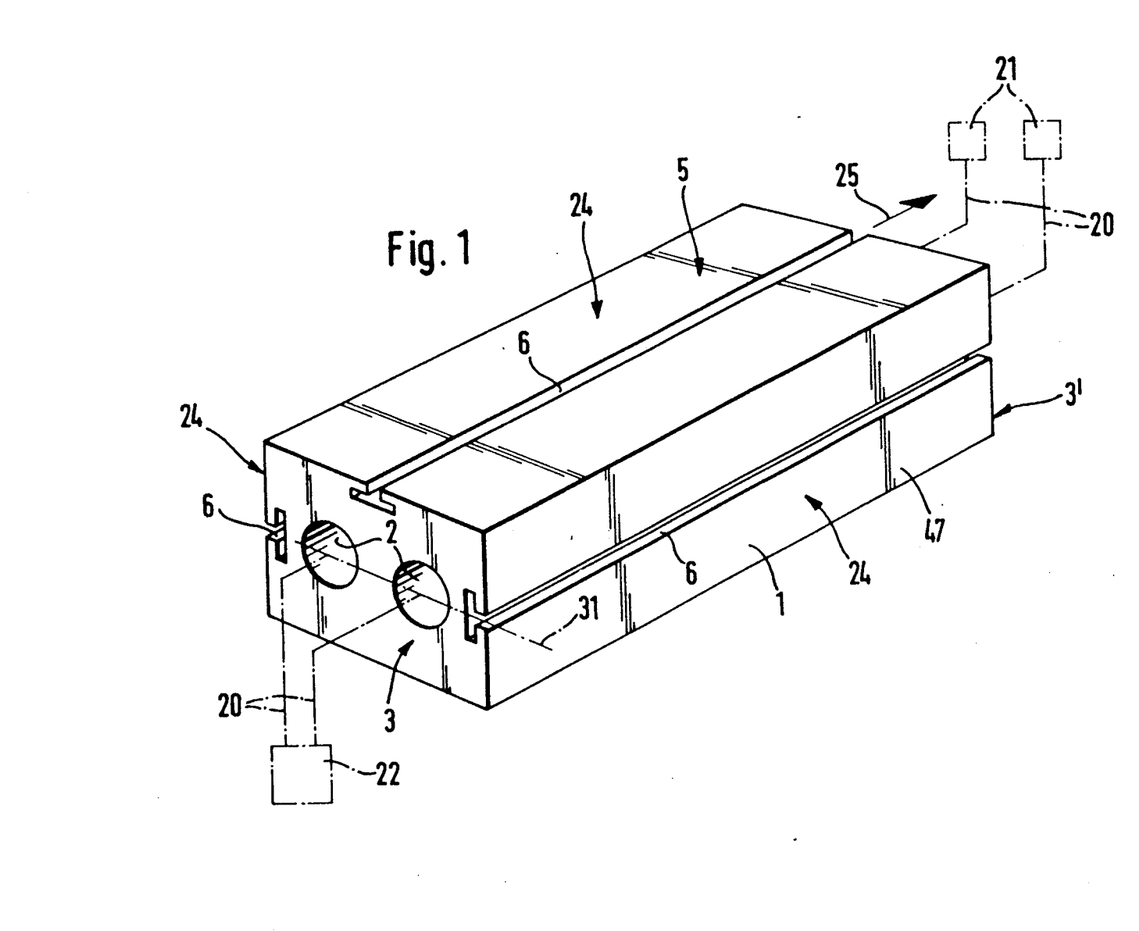
FIG. 1 shows a first form of construction of the device in accordance with the invention in perspective.
Figure 2:
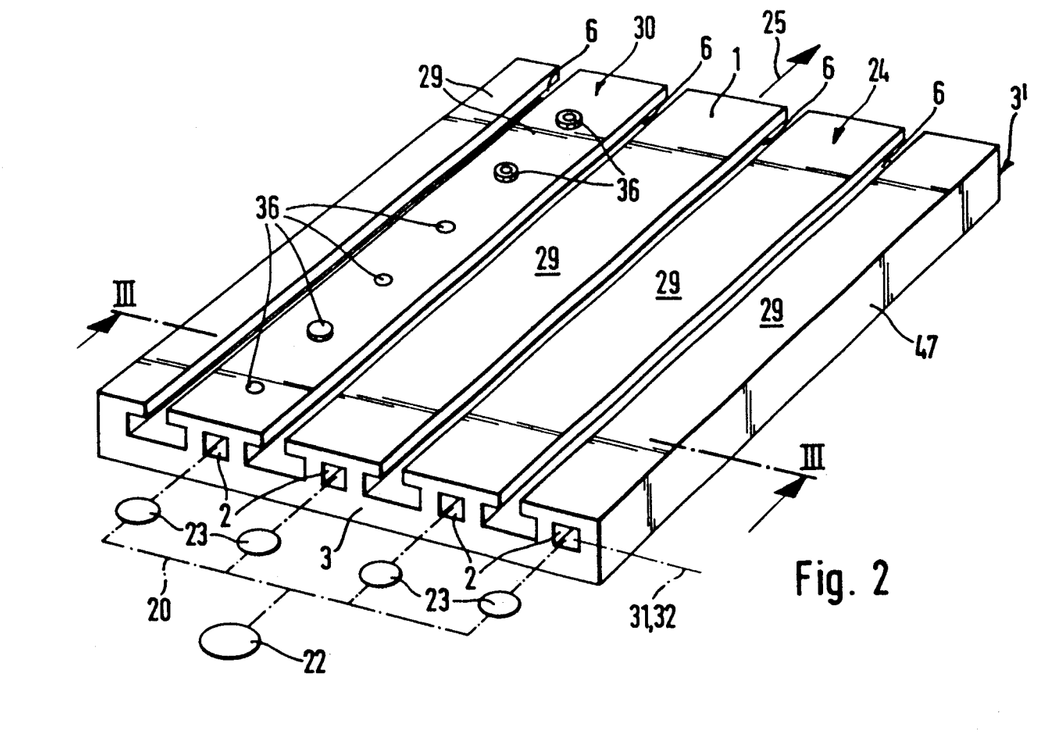
FIG. 2 shows a further working example of the invention, also in perspective.
Figure 3:
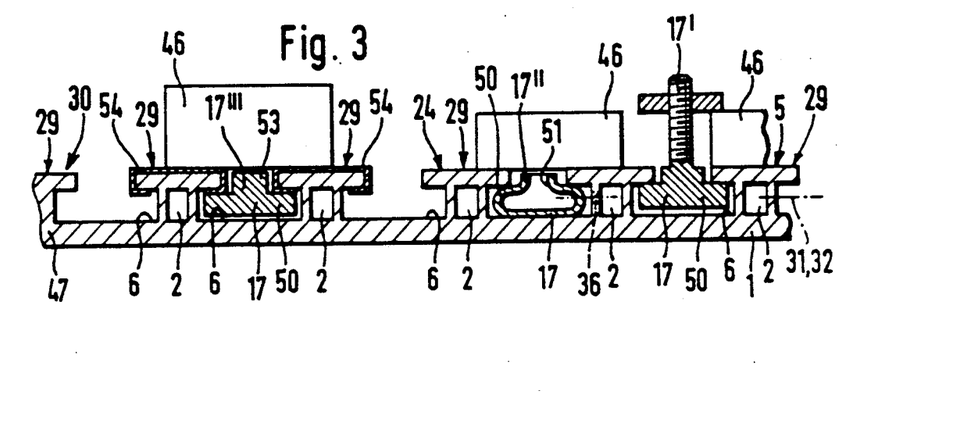
FIG. 3 is a cross section taken through the device of FIG. 2 on the line III—III, some fastening means arranged in the attachment recesses being indicated in addition.

These planes 31 and 32 may coincide (FIGS. 2 and 3). In this case it is preferred to provide one (or possibly more) supply conductor 2 between two respectively adjacent attachment recesses, or vice versa. This makes possible particularly thin tabular forms. The conductor and recess planes 31 and 32 may also be plane-parallel to each other (see FIGS. 4, 6, 8 and 18), and it is possible for the supply conductors 2 and recesses 6 to be undercut by and to overlap each other in the material of the member. In the working examples shown in FIGS. 3 through 6 the recesses and conductors are arranged transversely in relation to the longitudinal direction 25, either interleaved with a transverse spacing between each other, or overlying each other. There is the further feature that one respective supply conductor 2 in the interior of the member is arranged opposite to a respective attachment recess 6 on the side of the recess opposite to the longitudinal side thereof which opens to the outer surface 24.

Figure 6:
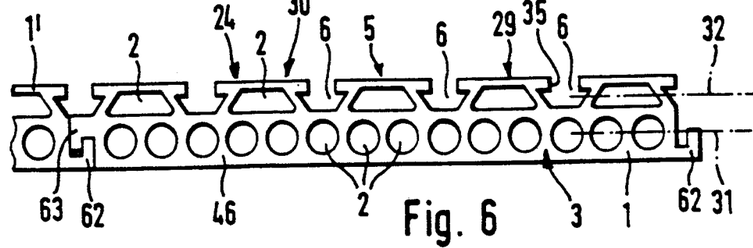
FIG. 6 is and end-on view of a preferred form of a supply member in which for indicating the possibility of lateral juxtaposition a portion of a further supply member is shown which has been coupled with the first member.

As indicated in FIG. 6 it is also possible to have combinations of the conductor arrangement as described above.

It is convenient if the conductor planes 31 and/or the recess planes 32 are parallel to at least one outer surface 24, more especially the holding surface 30 (see for instance the FIGS. 6 and 8).

Generally, the supply conductors 2 may have any desired cross section and polygonal, oval or circular cross sections are possible. In the working example of FIG. 7 there is an exceptional feature since the (in this case) two supply conductors 2 are so shaped and so arranged in the supply member that they each possess a first conductor cross section part 33 which is located on the side of a respective attachment recess 6 opposite to the longitudinal opening of the respective attachment recess 6, and a further conductor cross section part 34 which extends into the part of the supply member 1 beside the respective attachment recess 6 and in particular between two attachment recesses 6. The cross sectional shape of the conductors 2 is in this case stepped. There are advantages due to the reduced amount of material needed, the larger conductor cross section and the proximity of the conductors 2 to the outer surface 24. The latter feature is advantageous if a supply conductor 2 is to be tapped in the manner now to be described.

The separate attachment recesses 6 are so shaped and more particularly have such a cross section that fastening means for structures to be joined thereto may be arranged in the recesses and preferably also anchored therein. T-slots have proved to be convenient arranged so that their necks open at the outer surface 24. These designs are to be seen in FIGS. 1 through 5, 8 through 13 and 15. Furthermore dovetail grooves as shown in FIGS. 8 and 15 through 18 are advantageous. Further possible designs are to be seen by way of example only in FIGS. 6 and 7, in which the neck 35 of the recess opening at the outer surface 24 adjoins a recess section with a trapezoidal cross section, whose major basic side is associated with the recess neck 35.

Figure 4:
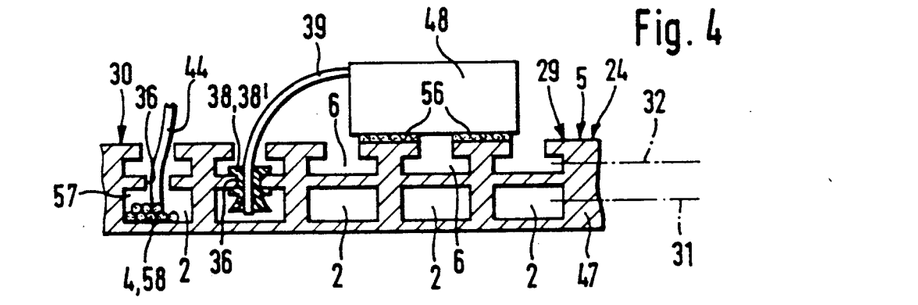
FIG. 4 illustrates a further working example of the device in accordance with the invention in cross section in a manner similar to the previous section III—III, the possibility of tapping supply conductors being indicated.
Figure 5:
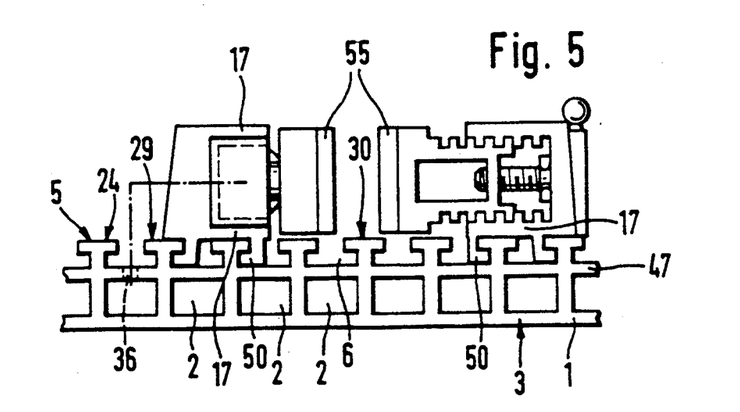
FIG. 5 shows the device as in FIG. 4 with fastening means arranged in the attachment recesses, forming part of a work holding device.

FIGS. 2 through 4, 7 and 8 show by way of example a further advantageous form of the invention, in accordance with which at least one of the supply conductors 2 is connected with at least one connection opening 36 extending through the supply member 1 and running transversely to this supply conductor 2, same ending at the other end on the outer surface of the supply member 1 (the opening 36 in FIGS. 3 and 5 is only marked in broken lines). Such a connection opening 36 may be used to produce a connection with one or more supply conductors 2 and the outside at any desired point on the supply member 1. The supply conductors 2 are practically able to be tapped and via the connection openings 36 it is possible for a fluid associated with the tapped supply conductor 2 to be supplied. Equipment or components placed adjacent to the supply member 1 may thus be connected along short connection paths with the fluid for supply thereof or such fluid may be discharged therefrom in this way. It is more particularly the supply and discharge of fluid to and from equipment secured to the apparatus by attachment recesses 6 which then becomes extremely simple. Devices such as the cylinder unit 9 may be rapidly coupled with the supply conductor 2 via connection openings 36 using hoses or other conductors 39 (see FIGS. 4 and 7).

Each supply conductor 2 may be associated with more than one connection 36 at the same time (see FIG. 2), which in this case are preferably arranged like a row of openings or holes in consecutive sequence. The row of holes extends preferably in parallel to the tapped supply conductor 2. It is then possible to arrange a connection along the shortest possible path with a respective supply conductor 2 from any point on the outer surface 24 and, respectively, the holding surface 30 in a simple, trouble-free manner.

In this respect it may be a question of connection openings 36 provided by the manufacturer. However the system may be so designed that the user of the members is able to subsequently produce the connection openings 36 at the desired points, as for example by piercing using an awl or the like. It is best to use a method of producing tapping holes which does not produce shavings, i.e. not to use a twist drill.

Figure 7:
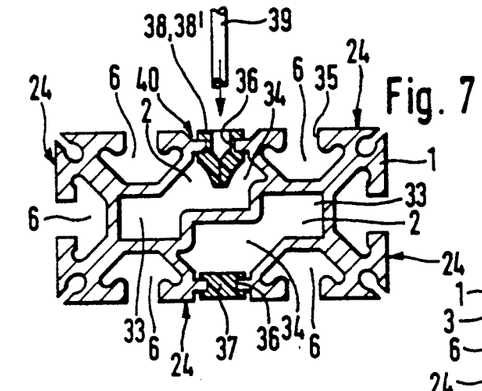
FIG. 7 is a cross section taken through a further device which is more especially in the form of a strand or other elongated member.

In order to seal off connection holes 36 which are not required, it possible to provide such holes with sealing means 37, which are preferably fluid-tight and are able to be removed. As an example FIG. 7 shows a snap-in plastic plug and FIG. 8 shows a screw-in plug. In order to make possible a rapid connection of external equipment when needed, the connection holes 36 may also be provided with connection devices 38 to provide for the connection of fluid conductors such as hose, other pipes 39 or the like, in order to supply the fluid to some desired point. A particularly preferred arrangement includes the connector 38' indicated in FIGS. 4 and 7, which is adapted for a plug-in connection with hose or the like and when the hose is removed performs a check valve function and prevents discharge of fluid from the supply conductor 2. In this respect attention is called to the German patent No. 3,346,141 which describes further details of such a valve-like connector.

The tapping of the supply conductors 2 may take place via attachment recesses 6 (see FIG. 4), if the associated connection opening 36 opens into such a recess. In this manner it is possible to prevent sealing or connecting devices projecting past the outer or holding surfaces 24 and 30. The points of opening may however also be located in recesses 40 provided in the member in addition to the attachment recesses 6 (FIG. 7) or on an outer or holding surface 24 and 30 (FIG. 2).

If a supply conductor 2 is used for the conduction of energy in the form of electrical or optical signals and for this purpose suitable conducting elements 44 as for instance in the form of a cable 4, are placed in the conductor 2, these elements may be led via connection openings 36 out of the supply conductor and run to the desired position (as indicated in FIG. 4). Moreover the supply conductors 2 may in any case also have the function of fluid conductors.

Each supply member 1 may more particularly take the form of a holding or clamping member 47 for objects such as workpieces 46, parts of machines, units 9 and 48, fixtures such as sensors 49 and the like. In this case the attachment recesses 6 are provided for the reception of fastening means 50, which are more particularly designed to be longitudinally slid, for such objects or fittings. The fastening means 50 may be components of the objects themselves, as for instance the foot of the unit 9 or of the fixture 15. However it may also in particular be a part of a holding or clamping device 17 (FIG. 5).

Reference numeral 17' (FIG. 3) denotes a mechanical holding or clamping device which is anchored by means of its foot part, which forms the fastening means 50, in an attachment recess. At 17" there is a fluid operated holding device, which is mounted in an attachment recess 6 and is able to be operated via a supply conductor 2 using vacuum so that by drawing off the air via a port 51 adjacent to the holding surface 30 it with hold an object by the vacuum action. Magnetic holding devices 17''' would also be possible which might be used to secure objects 46 magnetically on the supply member 1. In this respect a magnet element 53 mounted in the attachment recess 6 is used, which is able to be coupled with magnetizable support elements 54 in order to increase the magnetic holding surface. The support elements 54 surround the individual surface sections 29 and fit into the adjacent attachment recesses.

The holding device 17 depicted in FIG. 5 is similar to a vise in design and has two gripping jaws 55, of which one is able to be pneumatically moved. The pneumatic power is in this case supplied via a tapped supply conductor 2, which is indicated in broken lines.

It is also possible to use contact adhesive or normal adhesive means, which is depicted in FIG. 4 at 56 in the form of contact adhesive or plain adhesive foils applied to the surface sections 29. It will be seen that the unit 48 held on this holding device is connected via pressure fluid conductor 39 and a connection member 38' with a supply conductor 2.

A respective supply member 1 may have at least one receiving space 57 for the elements 58 to be laid therein. The element 58 may be in the form of electric cable or optical light guides, which form a supply conductor 2 (see FIG. 4). The receiving space 57 may however also be arranged, for instance directly on the outer periphery of the supply member 1 itself (FIG. 16) or on a fixture 15 (see FIG. 15) which is detachably secured to the supply member. The receiving space here preferably has a trough-like form and is able to be closed by means of a lid. It extends in the longitudinal direction.

It is preferred to connect or couple a number of the supply members together permanently so that they are juxtaposed.

FIG. 6 shows the possibility of lateral juxtaposition, in the case of which on at least one supply member 1 a further supply member 1' is detachably connected at the side. The connection is in this case preferably by use of connecting means 62 and 63, as for instance in the form of interlocking lateral projections which for instance have a hook shape in cross section, arranged on the outer periphery of the respective supply members 1 and 1'. It is more especially in cases in which the supply members 1 are used as holding plates that simple hooking together makes possible any desired increase in size of the available holding faces.

Figure 10:
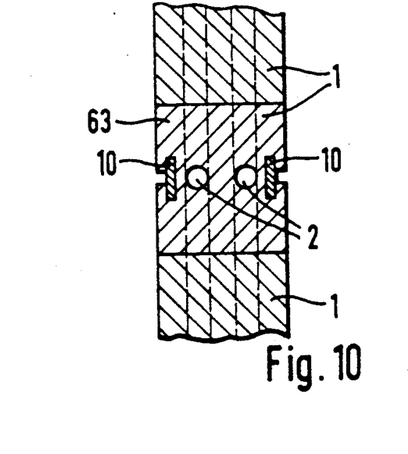
FIG. 10 shows the arrangement of FIG. 9 in a section taken on the line X—X.
Figure 11:
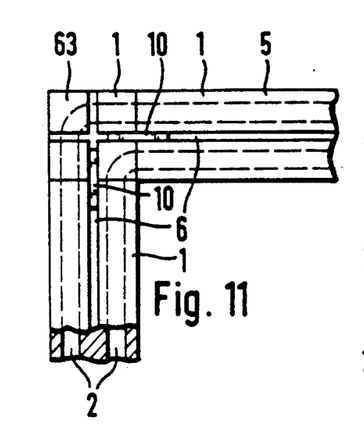
FIG. 11 indicates a further possibility for the juxtaposition of supply members.
Figure 12:
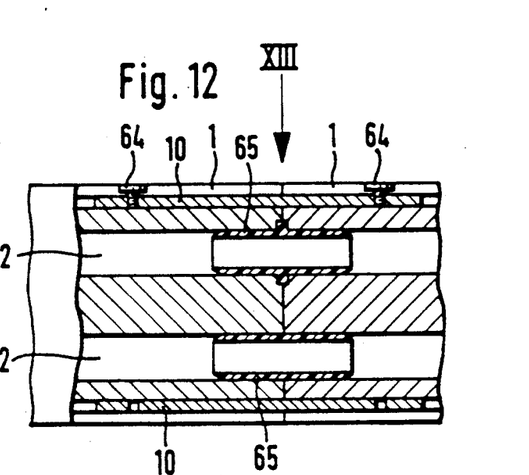
FIG. 12 shows a partly broken away connection zone between two coupled supply members.
Figure 13:
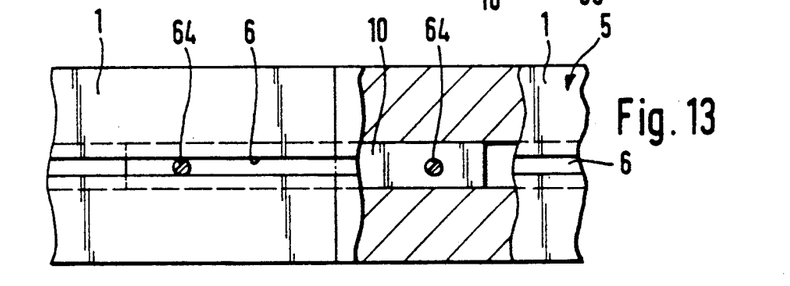
FIG. 13 is a plan view looking down onto the connection zone of FIG. 12 in the, direction indicated by the arrow XIII.

FIGS. 9 through 13 indicative by way of example the possibility of arranging two or more supply members 1 at the ends of conductors at the member sides 3 and 3' in order to extend the supply conductors 2 and/or attachment recesses 6 in sequence and connect them together. The individual supply members 1 are so aligned that the openings present are in communication with each other, the connection to be sealed between the supply conductors 2 of two supply members 1 taking place with the use of intermediate sealing elements 65. FIG. 12 shows two possible embodiments of such sealing elements 65, which are generally in the form of sleeves and terminally are inserted into the conductors to be coupled. The sealing elements 65 may form parts of a strip-like gasket.

Figure 9:
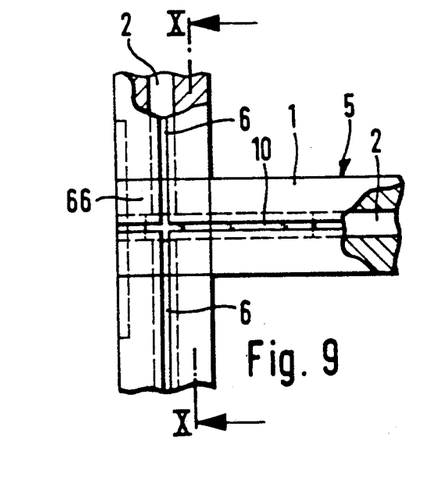
FIG. 9 indicates the possibility of the sequential arrangement of a plurality of supply members, one such supply member being in the form of a female coupling member.

As is indicated in the FIGS. 9 through 11, the supply members 1 serving as coupling parts 66 may be utilized in addition in order to make it possible to produce changes in direction and/or to produce branches in the duct.

In order to hold together supply members 1 in the longitudinal direction 25 the attachment recesses 6, aligned with each other, may for instance have rail-like connecting elements 10 arranged in them at the end so that the two end sections thereof respectively extend some distance into the attachment recess of the supply members on each side. The result is then a stiffening and strengthening of the connection, whose strength may be still further enhanced by the provision of additional attachment means 64 such as, to take an example, releasable clamping devices or the like.

Figure 18:
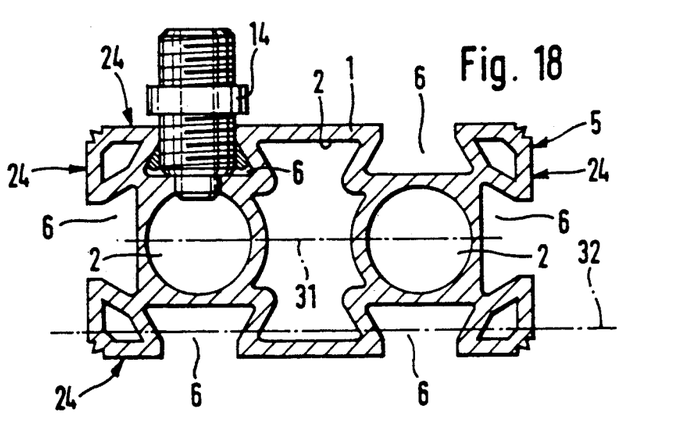

As will be seen from FIGS. 17 and 18 for each supply member it is possible to also provide supply conductors 2 in order to make optimum use of the volume of the member. Even if some of the conductors are not used, their presence leads to a substantial saving in weight.

The holding member may also be formed by the upper side of a work holding table or block.

I claim:

1. A mounting plate means with conduit structure comprising:

a mounting plate including means defining in an outer peripheral surface thereof a plurality of adjacent, laterally spaced, groove-like attachment recesses which extend linearly and parallel to each other, said mounting plate having a pair of generally opposite end surfaces which are contiguous with opposite ends of said outer peripheral surface, each said attachment recess extending continuously between and opening into both of said end surfaces, said outer peripheral surface of said mounting plate being divided by said attachment recesses into a plurality of surface sections respectively defined laterally between mutually adjacent pairs of said attachment recesses;

fastening means received within at least one said attachment recesses for detachably mounting objects on said outer peripheral surface of said mounting plate;

at least one object mounted on said outer peripheral surface of said mounting plate by said fastening means;

means defining in said mounting plate a plurality of separate internal supply conduits for receiving therein a physical medium and conducting the physical medium through said mounting plate, said supply conduits extending linearly and being parallel to and adjacent said attachment recesses, said supply conduits extending continuously between and opening into said opposite end surfaces of said mounting plate;

energizing means connected to at least one of said supply conduits on at least one of said end surfaces of said mounting plate for energizing the physical medium in said supply conduit; and means defining in said mounting plate a connection passage for connecting said at least one supply conduit to said at least one object mounted on said outer peripheral surface, said connection passage extending transversely to said supply conduits and opening at one end thereof into said at least one supply conduit and at another end thereof into said outer peripheral surface, said at least one object being connected to said at least one supply conduit by said connection passage.

2. The mounting plate means of claim 1, wherein said mounting plate is an extruded body.

3. The mounting plates means of claim 2, wherein said mounting plate is made of aluminum.

4. The mounting plate means of claim 1, wherein each of said supply conduits intersects a common conduit plane which passes through said mounting plate.

5. The mounting plate means of claim 4, wherein said conduit plane is parallel to a recess plane which is intersected by each of said attachment recesses.

6. The mounting plate means of claim 5, wherein said conduit and recess planes are coincident, and wherein at least one said supply conduit is arranged between every two adjacent said attachment recesses.

7. The mounting plate means of claim 5, wherein said conduit and recess planes are mutually offset from each other in a direction which is transverse relative to a direction in which said supply conduits extend, said attachment recesses opening oppositely away from said supply conduits.

8. The mounting plate means of claim 1, wherein said outer peripheral surface of said mounting plate, as seen in cross section, has a substantially rectangular outline, and wherein at least one of said attachment recesses is arranged on a laterally facing part of said outer peripheral surface.

9. The mounting plate means of claim 1, wherein at least one said supply conduit includes first and second portions, one of said attachment recesses opening oppositely away from said first portion and being located laterally alongside said second portion.

10. The mounting plate means of claim 1, including a plurality of said mounting plates laterally coupled together, said mounting plates having, on adjacent laterally facing parts of said outer peripheral surfaces thereof, respective interlocking projections for laterally coupling said mounting plates.

11. The mounting plate means of claim 10, wherein said interlocking projections are hooks which hook matingly into each other to couple two adjacent said mounting plates.

12. The mounting plate means of claim 1, including a plurality of said mounting plates coupled together at said end surfaces thereof, adjacent said end surfaces of said mounting plates being positioned to permit alignment and connection of said attachment recesses of said adjacent mounting plates and of said supply conduits of said adjacent mounting plates.

13. The mounting plate means of claim 12, wherein sealing means are received in and interposed between said aligned supply conduits of said adjacent mounting plates.

14. The mounting plate means as claimed in claim 12, including connecting elements having opposite end portions inserted respectively in said aligned attachment recesses of said adjacent mounting plates.

15. The mounting plate means of claim 14, wherein said connecting elements are of rail-like shape, and wherein means are provided for detachably connecting each said end portion to a respective said mounting plate.

16. The mounting plate means of claim 1, wherein said another end of said connection passage opens into one of said attachment recesses.

17. The mounting plate means of claim 1, wherein said outer peripheral surface includes means defining therein a further recess, said another end of said connection passage opening into said further recess.

18. The mounting plate means of claim 1, wherein said another end of said connection passage opens into one of said surface sections.

19. The mounting plate means of claim 1, including at least one sealing means for sealing off said connection passage.

20. The mounting plate means of claim 1, including at least one connection device inserted in said connection passage, and a connection means received in said connection device for connecting said connection passage to said at least one object.

21. The mounting plate means of claim 20, wherein said connection device comprises a check valve means, and wherein said connection means includes a hose.

22. The mounting plate means of claim 1, wherein at least one said supply conduit is a fluid conduit.

23. The mounting plate means of claim 1, wherein at least one said supply conduit has electrical connecting cables inserted therein and extending therethrough.

24. The mounting plate means of claim 1, wherein said fastening means includes one of a mechanically operated holding device, a fluid operated holding device, and a magnetically operated holding device.

25. The mounting plate means of claim 1, wherein said fastening means and said at least one object form together a structural unit which is detachable as a unit from said mounting plate.

* * * * *

UNITED STATES PATENT AND TRADEMARK OFFICE
CERTIFICATE OF CORRECTION

PATENT NO. : 5,025,834

DATED : June 25, 1991

INVENTOR(S) : Kurt STOLL

It is certified that error appears in the above-identified patent and that said Letters Patent is hereby corrected as shown below:

On the title page, item [54] and in column 1, in the title, change "Storing" with ---Having---.

Column 9, line 5; after "one" insert ---of---.

Signed and Sealed this

Fifth Day of January, 1993

Attest:

DOUGLAS B. COMER

*Attesting Officer*     Acting Commissioner of Patents and Trademarks